Patented Jan. 19, 1937

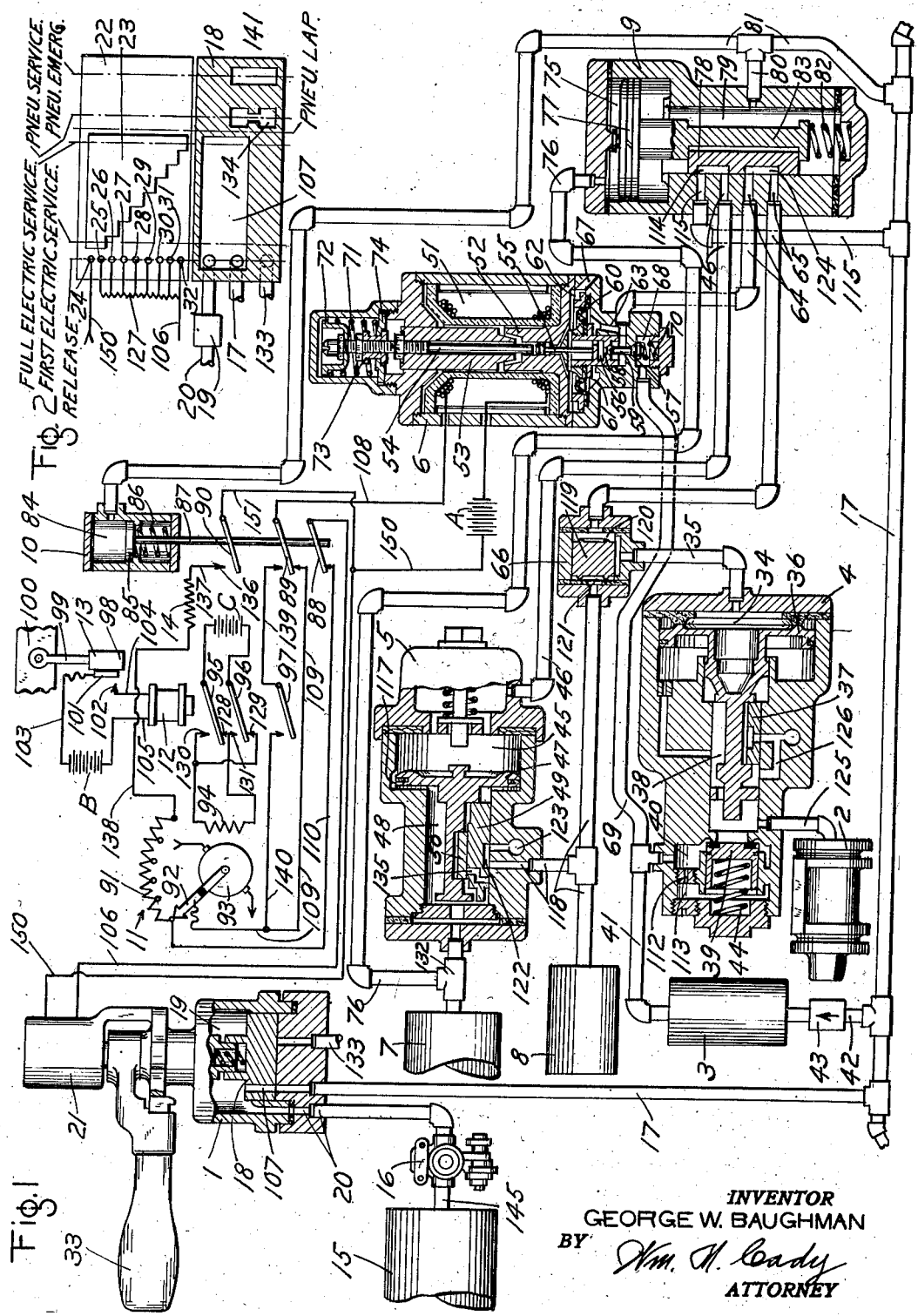

2,068,365

UNITED STATES PATENT OFFICE 2,068,365

BRAKING APPARATUS

George W. Baughman, Edgewood, Pa., assignor to The Westinghouse Air Brake Company, Wilmerding, Pa., a corporation of Pennsylvania Application January 16, 1935, Serial No. 2,042

16 Claims. (Cl. 303—24)

This invention relates to electropneumatic brake equipment, and more particularly to such an equipment for high speed railway vehicles.

In the control of railway vehicles operating in high speed service, it is important that the brake equipment provide a high retarding force in the minimum of time in order that the vehicle may be brought to a stop quickly. It is the principal object of this invention to provide an improved electropneumatic brake equipment for controlling railway vehicles operating in high speed service.

Another object of the invention is to provide an electropneumatic brake equipment including a triple valve device responsive, in the usual manner, to variations in brake pipe pressure for controlling the brakes and also including means whereby, when brake pipe pressure is reduced to a degree which would produce wheel sliding at the stop, the triple valve device is automatically cut off from the brake pipe and is thereafter automatically controlled by electrically operated means in such a manner that the rate of retardation of the vehicle is maintained substantially constant at a predetermined degree which will not produce wheel sliding. Thus, a vehicle having an equipment of this type may be hauled "dead" in a train, the brakes being controlled from a control car or locomotive by varying brake pipe pressure, and the brake applications on said vehicle will be limited to a predetermined degree which will not produce wheel sliding.

Other objects and advantages will appear from the following more detailed description of the invention.

In the accompanying drawing; Fig. 1 is a diagrammatic view, mainly in section, of a fluid pressure brake equipment embodying the invention; and Fig. 2 is a diagrammatic development of the combined brake switch and brake valve device showing the operating positions of said device and the connections established therein.

Referring to Fig. 1, the equipment may comprise a combined brake switch and automatic brake valve device 1 for controlling the brakes either electrically or pneumatically; a brake cylinder 2; a supply reservoir 3; a relay valve device 4 for controlling the supply of fluid under pressure from the supply reservoir 3 to the brake cylinder 2 and for controlling the release of fluid under pressure from said brake cylinder; a triple valve device 5 for controlling the operation of the relay valve device 4 when operating pneumatically; a self-lapping magnet valve device 6 for controlling the operation of the relay valve device 4 when operating electrically and for controlling the operation of the triple valve device 5 upon a predetermined reduction in brake pipe pressure; a control reservoir 7; a volume reservoir 8 for limiting the pressure obtained in the brake cylinder when the application of the brake is controlled by the triple valve device; a brake pipe 17; a transfer valve device 9 for cutting off the triple valve device 10 from the brake pipe upon a predetermiend reduction in brake pipe pressure and for thereupon connecting said triple valve device to the self-lapping magnet valve device; a transfer valve switch device 10; a motor-driven rheostat 11 for controlling the supply of electric current to the self-lapping magnet valve device; a relay 12; a retardation controller device 13 for controlling the relay device 12; a resistance unit 14; a main reservoir 15; a feed valve device 16, and a double check valve device 66.

The combined brake switch and brake valve device 1 may comprise a pneumatic portion for controlling the variations in the pressure of the fluid in the brake pipe in the usual manner, for pneumatically controlling the brakes. The pneumatic portion comprises a rotary valve 18 contained in a valve chamber 19 which is connected through a passage and pipe 20 with the feed valve device 16 which is of the well known construction and which is adapted to reduce the pressure of the fluid supplied from the main reservoir 15 to the valve chamber 19. The combined brake switch and brake valve device also comprises a switch portion 21 which may comprise a movable drum 22 upon which is mounted a contact 23 which is adapted to engage at certain times, as will hereinafter more fully appear, certain of the stationary contacts 24 to 32 inclusive, for electrically controlling the operation of the brakes.

The drum 22 and the rotary valve 18 are preferably coupled so that when the operating handle 33 is moved, both the drum and rotary valve are moved in like degree.

The combined brake switch and brake valve device 1 is provided with a release position, a plurality of electric service positions in which different degrees of brake application are effected electrically, a pneumatic lap position, a pneumatic service position in which the brakes are applied with a service application by pneumatic operation in the usual manner, and a pneumatic emergency position in which the brake pipe pressure is reduced at an emergency rate, to effect an emergency application of the brakes.

The relay valve device 4 may comprise a casing having a piston chamber 34 connected to a pipe 35 and containing a piston 36. Said piston is adapted to operate a release slide valve 37 contained in a valve chamber 38 and also a poppet supply valve 39 contained in a valve chamber 40. The valve chamber 40 is connected by a pipe 41 to the supply reservoir 3, which reservoir is adapted to be charged with fluid under pressure as supplied from the brake pipe 17 through a pipe 42 containing a non-return check valve 43. A coil spring 44 urges the valve 39 to its seat.

The triple valve device 5 may be of the type commonly employed, comprising a casing having a piston chamber 45 connected by a pipe 46 to the transfer valve device 9 and containing a piston 47, and a valve chamber 48 connected by a pipe 132 to the control reservoir 7 and containing a main slide valve 49 and a graduating slide valve 50 adapted to be operated by the piston 47.

The self-lapping magnet valve device 6 controls, at one time, the supply of fluid under pressure to and its release from the piston chamber 34 of the relay valve device 4 and, at another time, the supply of fluid under pressure to and its release from the piston chamber 45 of the triple valve device 5. The self-lapping magnet valve device may comprise a magnet coil 51, a stationary core 52, and a movable core member 53 which is actuated downwardly when the magnet coil 51 is energized. Secured to the core member 53 is a stem 54 which, when moved downwardly, engages a pin 55, which pin in turn actuates a sliding member 56 to cause a supply valve 57 to be unseated. The sliding member 56 is provided with a valve seat 58 which engages and interfits with the end of the stem of the supply valve 57, which end forms a release valve 59.

The sliding member 56 is normally held in an upper or release position by a resilient diaphragm 60 which is secured thereto and to the casing of the self-lapping magnet valve device in a manner to form a chamber 61 therebelow and a chamber 62 thereabove. The chamber 61 is open through passage 63 to pipe 64 leading to the transfer valve device 9 and said pipe is normally connected to the piston chamber 34 of the relay valve device 4 through said transfer valve device and thence through pipe 65, the double check valve device 66 and pipe 35. The pipe 64 is also adapted to be connected through the transfer valve device 9, in a manner which will appear hereinafter, to the piston chamber 45 of the triple valve device 5. Thus, the chamber 61 is adapted to be connected at one time to the piston chamber 34 of the relay valve device 4 and at another time to the piston chamber 45 of the triple valve device 5. The chamber 62 is connected to the atmosphere through the passage 67.

The supply valve 57 controls communication from chamber 68, which is open to the supply reservoir 3 through the pipes 69 and 41, to the chamber 61 by way of passage 63, said valve being urged toward its seated position by a spring 70. The release valve 59 controls communication from chamber 61 to chamber 62 and thence to the atmosphere through the passage 67. With the sliding member 56 in its upper or release position, as shown in the drawing, the release valve 59 is unseated.

The downward movement of the movable core 53 and the stem 54 is opposed by a spring 71 reacting against a spring seat 72 secured to the upper end of the stem 54. The downward movement of the movable core 53 and stem 54 is limited by a flanged collar 73, which is adapted to engage a stop washer 74 upon a predetermined downward movement of the core and stem.

As may be seen from the construction shown in the drawing, the spring seat 72 is adjustable with respect to the stem 54 and the flanged collar 73 may be adjusted to different positions along the stem 54. Further adjustment is provided in that the stem 54 has a screw-threaded connection with the movable core 53.

When the magnet coil 51 is energized, the supply valve 57 is unseated an amount in accordance with the downward movement of the stem 54 and core 53. This movement is opposed by the spring 70 and is thus determined by the degree of energization of the magnet coil 51.

The transfer valve device 9 comprises a casing having a piston chamber 75 connected to a pipe 76, which in turn is connected to pipe 132 leading to the control reservoir 7, and containing a piston 77. The piston 77 is adapted to operate a slide valve 78 contained in a valve chamber 79 which is connected to the brake pipe 17 through the pipes 80 and 81. The piston 77 and slide valve 78 are urged to their upper or normal positions, as shown in the drawing, by a spring 82 acting on the piston stem 83.

The transfer valve switch device 10 may comprise a casing having a chamber 84 connected to pipe 81 leading to the brake pipe 17 and containing a piston 85 subject to the pressure of a spring 86 acting to urge said piston to its upper position against the pressure of the fluid in chamber 84. The piston 85 has a stem 87 which operates the contacts 88, 89 and 90 which control certain electric circuits to be described in detail hereinafter.

The motor driven rheostat 11 may comprise a variable resistance unit 91, a control lever 92 for controlling said resistance, and an electrically operated motor comprising an armature 93 for operating said control lever, and a field coil 94.

The relay 12 controls the operation of the contacts 95, 96 and 97. The contacts 95 and 96 control the circuits from a suitable source of electric current such as a battery indicated at C, to the field coil 94 of the motor driven rheostat 11, while contact 97 controls a circuit to the self-lapping magnet valve device 6, as will be understood from the description hereinafter. One terminal of the relay 12 is connected by a wire 104 to a contact 102 which is controlled by the retardation controller device 13, in a manner which will presently appear, while the other terminal of said relay is connected by a wire 105 to one terminal of a suitable source of current such as a battery indicated at B, the other terminal of said source being connected to the retardation controller device 13, as will presently appear.

Energization of the relay 12 is controlled by a retardation controller device 13 which may comprise a weight 98 having a supporting rod 99 pivotally mounted on a portion 100 of the vehicle frame and carrying a contact 101 insulated therefrom and connected by a wire 103 to the terminal of the source of electric current B of which the other terminal is connected to the relay device 12, as hereinbefore explained. The retardation controller device is positioned on the vehicle so that when said vehicle is decelerating, the weight 98 is moved forwardly, or leftwardly as viewed in Fig. 1, by its inertia, and the proportioning of the parts and the position of the contact 102 with respect to the contact 101 is such that when the rate of deceleration exceeds the desired maximum rate, the contact 101 will engage the contact 102.

The double check valve device 66 is interposed in the piping between the pipe 65 leading to the transfer valve device and a pipe 118 leading to the volume reservoir 8 and may comprise a casing containing a double check valve 119, the chamber 120 at one side of said check valve being connected to the pipe 65 and the chamber 121 at the other side of said check valve being connected to the pipe 118.

In operation, air is supplied from the main reservoir 15 through pipe 145 to the feed valve device 16 which operates to supply fluid to the rotary valve chamber 19 through the pipe and passage 20 at the pressure desired to be carried in the brake pipe 17.

Assuming the combined brake switch and brake valve device 1 to be in release position, fluid at feed valve pressure supplied to the rotary valve chamber 19 flows through port 107 in the rotary valve 18 to the brake pipe 17. Thus, the brake pipe is charged to the pressure supplied by the feed valve device.

Fluid under pressure supplied to the brake pipe 17 flows therefrom through the pipe 81 to chamber 84 in the transfer valve switch device 10, and when the pressure of the fluid in said chamber acting on piston 85 is a degree greater than the pressure exerted on said piston by the spring 86, said piston is moved downwardly to the position shown in Fig. 1, causing the contact 89 to connect a wire 108, leading to one terminal of the magnet coil 51 of the self-lapping magnet valve device 6, to a wire 109, which is connected to the control lever 92 of the motor driven rheostat 11, the other terminal of said magnet coil being connected to a terminal of a suitable source of electric current, such as a battery indicated at A. The downward movement of the piston 85 also causes the contact 88 to connect a wire 110, leading to the left hand terminal, as viewed in Fig. 1, of the variable resistance unit 91 to the wire 106, which leads to the brake switch portion of the combined brake switch and brake valve device 1. The wire 106 is deenergized, however, because the brake valve device 1 being in the release position, the movable contact 23 is disengaged from the contact 24, which is connected to the other terminal of the source of electric current A by means of the wire 150, and also from the contacts 25 to 32. Thus, the energizing circuit to the magnet coil 51 is open and said coil remains deenergized. With the magnet coil 51 deenergized, the supply valve 57 is seated and the release valve 59 is unseated.

Fluid under pressure supplied to the brake pipe 17 flows therefrom through the pipe 42 and the non-return check valve device 43 to the supply reservoir 3, charging said reservoir to the pressure carried in the brake pipe.

Fluid under pressure supplied to the supply reservoir 3 flows therefrom through pipe 41 to valve chamber 40 of the relay valve device 4 and from thence through the restricted passage 112 into the chamber 113 back of the supply valve 39. From pipe 41, fluid under pressure also flows through pipe 69 to the supply valve chamber 68 of the self-lapping magnet valve device 6.

The operating parts of the transfer valve device 9 are normally in their upper positions, as shown in Fig. 1 and as will be explained hereinafter, in which a cavity 114 in the slide valve 78 establishes communication between passages 46 and 115. With this communication established, the piston chamber 45 of the triple valve device 5 is supplied with fluid under pressure from the brake pipe 17 through pipe and passage 115, cavity 114 in the slide valve 78, and passage and pipe 46. The piston 47 is thereby operated to shift the slide valves 49 and 50 to their release positions, as shown in the drawing. In the release position of the piston 47, fluid under pressure is permitted to flow from the piston chamber 45 through a feed groove 117 to valve chamber 48 and from thence through pipe 132 to the control reservoir 7, so as to charge said reservoir with fluid at brake pipe pressure.

With the slide valve 49 in release position, the volume reservoir 8 and the chamber 121 of the double check valve device 66 are vented to the atmosphere by way of the pipe and passage 118, cavity 122 in the slide valve 49 and the atmospheric passage 123.

From pipe 132, fluid under pressure also flows through the pipe 76 to the piston chamber 75 of the transfer valve device 9. The valve chamber 79 is charged with fluid from the brake pipe 17 by way of pipes 81 and 80. The fluid pressures acting on opposite sides of the piston 77 are thus balanced, and the spring 82 maintains said piston and the slide valve 78 in their upper or normal positions, as shown in the drawing.

With the release valve 59 of the self-lapping magnet valve device 6 unseated and the slide valve 78 of the transfer valve device 9 in its upper position, as hereinbefore explained, the piston chamber 34 of the relay valve device 4 is vented to the atmosphere by way of pipe 35, past the double check valve 119 of the double check valve device 66, chamber 120, pipe and passage 65, cavity 124 in the slide valve 78, passage and pipe 64, past the unseated release valve 59, chamber 62, and the atmospheric passage 67. With the piston chamber 34 thus normally at atmospheric pressure, the piston 36 and the release slide valve 37 assume the positions shown in the drawing, as will be explained hereinafter. With the release slide valve 37 in the position shown in the drawing, the brake cylinder 2 is connected to the atmosphere through the pipe 125, the release slide valve chamber 38 and an atmospheric passage 126.

When it is desired to effect an electric application of the brakes, the combined brake switch and brake valve device is turned from release position toward full electric service position a degree in accordance with the desired degree of braking. Assuming, for example, that said device is moved to the position where the movable contact 23 engages the fixed contact 28, but before engaging the fixed contact 29, it will be apparent that current is supplied to the magnet coil 51 of the self-lapping magnet valve device 6 through a circuit which may be traced through the wire 150 leading from the terminal of the source of electric current A, contacts 24, 23 and 28, the portion of the resistance 127 between contacts 28 and 32, wire 106, contact 88 of the transfer valve switch device 10, wire 110, the variable resistance unit 91, control lever 92, wire 109, contact 89 of the transfer valve switch device 10, wire 108, magnet coil 51, to the other terminal of the same source of current A.

Until the vehicle decelerates at a predetermined rate, the contact 101 of the retardation controller device remains disengaged from the contact 102 associated with the relay 12, and said relay therefore remains deenergized. With the relay 12 deenergized, the contacts 95 and 96 engage the contacts 128 and 129, respectively, associated with the field coil 94 of the motor driven rheostat 11, with the result that current is supplied from the source C to said field coil, the direction of flow of current therethrough being such that the armature 93 is held in the normal position, as shown in Fig. 1, wherein the control lever 92 cuts out of the circuit to the magnet coil 51 all of the variable resistance unit 91.

Thus, current is supplied to the magnet coil 51 through that portion of the resistance 127 in series therewith. The resulting energization of said magnet coil causes the movable core member 53 to be pulled downwardly, thereby causing the stem 54 to engage and move the pin 55 downwardly, and said pin through its engagement with the sliding member 56, causes said sliding member to move downwardly, so as to first seat the release valve 59 and then to unseat the supply valve 57 against the pressure of the spring 70. With the supply valve 57 unseated, fluid under pressure is supplied from the supply reservoir 3 to the piston chamber 34 of the relay valve device 4 through pipes 41 and 69, chamber 68 in the self-lapping magnet valve device 6, past the supply valve 57, pipe 64, the passage in the transfer valve device 9, cavity 124 in the slide valve 78, passage and pipe 65, chamber 120 of the double check valve device 66, and pipe 35, the check valve 119 of said double check valve device being shifted to its left hand seated position, if it should not already be in that position, by the pressure of fluid in chamber 120, the chamber 121 at the left hand side of said check valve being vented through the pipe and passage 118, the cavity 122 in the slide valve 50 of the triple valve device 5 and the atmospheric passage 123.

The pressure of the fluid supplied to the piston chamber 34 causes the piston 36 to be shifted to the left, operating the release slide valve 37 to cut off communication from the valve chamber 38 to the atmospheric exhaust passage 126 and then operating to unseat the supply valve 39. Fluid under pressure is then supplied from the supply reservoir 3 to valve chamber 38 and thence through pipe 125 to the brake cylinder 2.

Fluid supplied to the pipe 64, in the manner above explained, is also supplied, through passage 63, to the chamber 61 below the diaphragm 60. When the pressure in the relay piston chamber 34 and in the chamber 61 has been increased to a predetermined degree, the downward pressure of the movable core 53 is overcome by the upward pressure in chamber 61 acting on the diaphragm 60 plus the pressure of the spring 71, and the diaphragm therefore moves upwardly until the supply valve 57 is seated by the spring 70. Further flow of fluid under pressure from the supply reservoir 3 to the relay piston chamber 34 is thus cut off.

When the pressure in valve chamber 38 and in the brake cylinder 2 has been increased to a degree slightly exceeding the pressure acting in piston chamber 34, the piston 36 will be shifted to the right sufficiently to permit the supply valve 39 to seat and cut off the further supply of fluid under pressure to the brake cylinder.

The brake cylinder pressure may now be increased by moving the operating handle 33 of the combined brake switch and brake valve device farther in a direction toward full electric service position, so as to cut more of the resistance 127 out of the circuit to the magnet coil 51, and the magnetic flux of said coil being correspondingly increased, the self-lapping magnet valve device 6 again operates as above described to permit the further supply of fluid to the relay piston chamber 34 and thereby to the brake cylinder. When the operating handle 33 is moved to the full electric service position, all of the resistance 127 is cut out of the circuit, so that the magnet coil is energized to its maximum degree. As is obvious from the foregoing, the fluid pressure effected in the brake cylinder will then be at a maximum.

In case of leakage from the brake cylinder while the brakes are being held applied, the pressure in the valve chamber 38 being correspondingly reduced, the piston 36 will be shifted to the left so as to unseat the supply valve 39 and permit the supply of fluid to the brake cylinder until brake cylinder pressure has been increased to a degree greater than the pressure in chamber 34.

If the rate of retardation of the vehicle produced by the application of the brakes is sufficient to cause the weight 98 of the retardation controller device 13 to swing far enough to the left to cause engagement of contact 101 with contact 102, then the relay 12 is energized through a circuit which includes the wire 103, the course of current B, the wire 105, the relay 12, and the contacts 102 and 101. The resulting energization of the relay 12 causes the contacts 95 and 96 to be moved out of engagement with the contacts 128 and 129, respectively, and into engagement with the contacts 130 and 131, respectively. The direction of the flow of current from the source C through the field coil 94 of the motor driven rheostat 11 is now reversed and causes the armature 93 to turn in a clockwise direction from the position shown in Fig. 1, effecting movement in a clockwise direction of the control lever 92. This movement of the control lever causes a portion of the variable resistance unit 91 to be cut into the circuit to the magnet coil 51, the amount of resistance increasing as the movement of said lever progresses. The current flow through magnet coil 51 is thus reduced, correspondingly reducing the pulling force of the magnet coil and thus permitting the spring 71 to act so as to move the core 53 upwardly.

As the core 53 thus moves upwardly, the pressure of the stem 54, acting through the pin 55 and the sliding member 56, on the diaphragm 60, is relieved, whereupon the fluid in chamber 61 acts to move said diaphragm, and thereby said sliding member, upwardly. The upward movement of the sliding member 56 unseats the release valve 59 and thereby permits release of fluid under pressure from the relay piston chamber 34 by way of pipe 35, chamber 120 of the double check valve device 66, pipe and passage 65, cavity 124 in the slide valve 78 of the transfer valve device 9, passage and pipe 64, past the release valve 59, thence through chamber 62 and the atmospheric passage 67. The pressure of the fluid in the valve chamber 38 then causes the piston 36 to operate to its extreme right hand or release position, carrying with it the release slide valve 37. With the release slide valve 37 in release position, fluid under pressure is vented from the brake cylinder 2 to the atmosphere through pipe 125, valve chamber 38, past the release slide valve 37 and through the passage 126.

The chamber 61 in the self-lapping magnet valve device 6, being connected by passage 63 to pipe 64, contains fluid at the pressure supplied to said pipe which is the same as that in the relay piston chamber 34. Fluid under pressure will continue to be released from the relay piston chamber 34 in the manner above described until the pressure of the fluid in chamber 61 is reduced to a degree less than the downward pressure of the core 53, whereupon the sliding member 56 is operated so as to seat the release valve 59. With the release valve 59 seated, further release of fluid from the relay piston chamber 34 is cut off and when the pressure of the fluid in the valve chamber 38, and consequently in the brake cylinder 2, has been reduced slightly below that retained in chamber 34, the release slide valve 37 will be operated by the piston 36 so as to cut off communication from the valve chamber 38 to the atmospheric passage 126 and thereby cut off further flow of fluid from the brake cylinder to the atmosphere.

As the degree of application of the brakes is thus reduced, the weight 98 of the retardation controller device 13 swings toward the right, thus separating the contact 101 from engagement with the contact 102. The resulting deenergization of the relay 12 permits the contacts 95 and 96 to move out of engagement with the contacts 130 and 131, respectively, and into engagement with the contacts 128 and 129, respectively. The consequent reversal of the flow of current through the field coil 94 of the motor driven rheostat 11 causes the armature 93, and thereby the control lever 92, to turn in a counter-clockwise direction. Due to this movement of said control lever, the amount of resistance in the circuit to the magnet coil 51 is reduced and the consequent increase in the current flow therethrough causes the core 53 to be pulled downwardly, thereby causing the pin 55 to move the sliding member 56 downwardly so as to unseat the supply valve 57, thus again supplying fluid under pressure to the relay piston chamber 34 in the same manner as hereinbefore described, with the result that the relay valve device 4 operates to again supply fluid under pressure to the brake cylinder 2.

The above mentioned increase in brake cylinder pressure together with the increase in the coefficient of friction between the brake shoes and the wheels causes an increasing rate of retardation of the vehicle, whereupon the weight 98 of the retardation controller device 13 again swings to the left and thereby effects energization of the relay 12. With the relay 12 energized, the direction of the current flow through the field coil 94 is reversed and the control lever 92 is again operated to increase the amount of resistance in the circuit to the magnet coil 51. The consequent reduction in the current flow to the magnet coil 51 causes the self-lapping magnet valve device 6 to operate, in the same manner as hereinbefore described, to release fluid under pressure from the relay piston chamber 34. The relay valve device 4 then operates to again release fluid under pressure from the brake cylinder.

Thus the weight 98 moves alternately into and out of engagement with the contact 102 to effect the release of fluid under pressure from and the supply of fluid under pressure to the brake cylinder as the speed of the vehicle diminishes. It is obvious that as the tendency is for the rate of retardation to increase with a decrease in speed, due to the constantly increasing coefficient of friction, the brake cylinder pressure required to maintain the predetermined rate of retardation, that is, a rate which is effective to maintain the contact 101 in engagement with the contact 102, decreases with decreased speed, and therefore the portion of the variable resistance unit 91 which is connected in the circuit to the magnet coil 51, by the operation of the control lever 92, increases with each successive movement of said control lever in a clockwise direction. In other words, the control lever 92 is turned initially in a clockwise direction to first cut off the supply of fluid under pressure to the brake cylinder and then to release fluid under pressure from the brake cylinder and thereafter, as the speed of the vehicle diminishes, is moved alternately in a counterclockwise direction with a short movement to supply fluid under pressure to the brake cylinder and then in a clockwise direction with a longer movement to release fluid under pressure from the brake cylinder. Thus, the resistance connected in the circuit to the magnet coil 51, as the speed of the vehicle diminishes, is increased by an amount which will maintain a substantially constant rate of retardation throughout the deceleration period.

When the vehicle has been brought to a stop, the weight 98 of the retardation controller device 13 will swing toward the right to the normal position shown in Fig. 1, so that contacts 101 and 102 are disengaged. The consequent deenergization of the relay 12 will effect a reversal of the flow of current through the field coil 94, with the result that the control lever 92 will return to the normal position shown in Fig. 1, in which all of the variable resistance unit 91 is cut out of the circuit to the magnet coil 51.

It will be noted that when the relay 12 is energized, the contact 97 is operated to close the circuit from a wire 139 to a wire 140, but this has no significance at this time.

It will be seen from Fig. 2 that when the combined brake switch and brake valve device is turned to a position for effecting an electric application of the brakes, the brake pipe 17 is maintained charged from the rotary valve chamber 19 through the port 107 in the rotary valve 18.

The brakes may be released by turning the combined brake switch and brake valve device to release position, in which the circuit from the fixed contact 24 to the wire 106 is opened at the movable contact 23. The magnet coil 51 thus becomes deenergized and the consequent reduction in the pulling force of said coil on the movable core member 53 permits the spring 71 to move said member upwardly so that the stem 54 becomes disengaged from the pin 55. With the downwardly acting pressure of the core member 53 thus removed from the diaphragm 60, the fluid pressure in chamber 61 moves said diaphragm, and thereby the sliding member 56, upwardly. The upward movement of said sliding member causes the release valve 59 to be unseated, so that fluid under pressure is released from the relay piston chamber 34, and thereby from the brake cylinder, in the same manner as hereinbefore described.

If, instead of completely releasing the brakes, it is desired to graduate the brakes off, the combined brake switch and brake valve device is turned by partial successive movements toward release position. With each successive movement of said device toward release position, the portion of the resistance 127 in the circuit to the magnet coil becomes greater until, when said device is in release position, said circuit is open at the movable contact 23. The degree of energization of the magnet coil 51 is thus gradually reduced and the self-lapping magnet valve device 6 operates, in a manner similar to that hereinbefore described, to effect a gradual release of brake cylinder pressure.

When the vehicle is hauled "dead" as part of another train, with the electric control circuits intact and the electric control apparatus operative, the brakes on said vehicle may be controlled by the brake valve device on the towing vehicle (not shown). When brake pipe pressure is reduced, as by operation of said brake valve device, to effect an application of the brakes, the pressure of the fluid in the piston chamber 45 of the triple valve device 5 is reduced, since said chamber communicates with the brake pipe 17 through pipe and passage 46, cavity 114 in the slide valve 78 of the transfer valve device 9, and passage and pipe 115. When the pressure in the piston chamber 45 is thus reduced below the pressure in valve chamber 48, the piston 47 and slide valves 49 and 50 are shifted to the usual service position, in which fluid under pressure is permitted to flow from valve chamber 48 and the connected control reservoir 7 through the service port 135 in the main slide valve 49, and passage and pipe 118 to the chamber 121 in the double check valve device 66. The pressure of the fluid in the chamber 121 will move the double check valve 119 to the right and open communication from chamber 121 to the pipe 35, so that fluid under pressure supplied to said chamber from the control reservoir 7 will flow to the relay piston chamber 34, effecting operation of the relay valve device 4 to supply fluid under pressure to the brake cylinder in the same manner as hereinbefore described in connection with an electric application of the brakes.

When the brake application is controlled by the triple valve device, it is usually not necessary that the brake cylinder pressure be as high as when controlled electrically from the combined brake switch and brake valve device 1. In order to limit the pressures established in the brake cylinder, a volume reservoir 8 has been provided which is connected to the pipe 118, so that fluid under pressure supplied through said pipe to the relay piston chamber 34 will also flow to the volume reservoir 8.

It will be noted that a reduction in brake pipe pressure is also effective in an equal degree in the valve chamber 79 of the transfer valve device 9, and if the pressure in said chamber is reduced to a predetermined degree, depending upon the upwardly acting pressure of the spring 82 on the piston stem 83, the piston 77 and slide valve 78 will be moved downwardly to a position in which the cavity 114 in said slide valve disconnects passage 115, leading to the brake pipe 17, from passage 46, leading to the triple valve piston chamber 45, and connects passage 46 to passage 64, leading to the self-lapping magnet valve device 6. Thus, the triple valve device is disconnected from the brake pipe and is connected to the self-lapping magnet valve device. The value of the spring 82 is such that the piston 77 and the slide valve 78 will be held in their upper positions, as shown in Fig. 1, until and unless brake pipe pressure is reduced to an amount which will effect a degree of brake application sufficient to just cause the vehicle wheels to slide at the stop, at which time the pressure of said spring will be overcome and the piston 77 and slide valve 78 will be moved to their lower positions, as above described.

It will further be noted that a reduction in brake pipe pressure also effects a reduction in the pressure of the fluid in the chamber 84 of the transfer switch device 10, and when the pressure in said chamber has been reduced to a predetermined degree in effecting a pneumatic application of the brakes as above described, the spring 86 will cause the piston 85 to be moved upwardly to a position in which the contact 90 engages a contact 136 connected by a wire 137 to one terminal of the resistance unit 14, the other terminal of said resistance unit being connected by the wire 138 to the right hand terminal, as viewed in Fig. 1, of the variable resistance unit 91. The upward movement of the piston 85 also causes the contact 89 to connect the wire 108, leading to the magnet coil 51, to the wire 139, leading to the contact 97, and also causes the contact 88 to open the circuit from the wire 106 to the wire 110. The value of the spring 86 is preferably such that the piston 85 will be moved to its upper position substantially concurrently with the movement of the piston 77 and the slide valve 78 of the transfer valve device 9 to their lower positions.

Assuming that, up to this time, the rate of retardation has not increased to a degree sufficient to cause the retardation controller device 13 to operate to effect energization of the relay 12, the circuit to the magnet coil 51 is open at the contact 97 and said magnet coil therefore remains deenergized. With the magnet coil 51 deenergized, the release valve 59 remains unseated, so that fluid under pressure continues to vent from the triple valve piston chamber 45 through the pipe and passage 46, cavity 114 in the slide valve 78 in the transfer valve device 9, passage and pipe 64, past the unseated valve 59 in the self-lapping magnet valve device 6, and thence through chamber 62 and the atmospheric passage 67, thereby increasing the degree of brake application.

When the rate of retardation produced by the above described brake application has increased sufficiently, the weight 98 of the retardation controller device 13 will swing to the left, so that contact 101 will engage contact 102, thereby closing the circuit through which the relay 12 is energized. The energization of said relay causes the contacts 95, 96 and 97 to be moved to their upper positions.

With the contact 97 in its upper, or closed, position, the circuit is closed through which the magnet coil 51 is energized, which circuit may be traced as follows: a terminal of the source of current A, wires 150 and 151, contacts 99 and 136, wire 137, resistance unit 14, wire 138, the variable resistance unit 91, the control lever 92, wires 109 and 140, contact 97, wire 139, contact 89, wire 108, the magnet coil 51, and the other terminal of said source of current A.

With the contacts 95 and 96 in their upper positions, they engage the contacts 130 and 131, respectively, associated with the field coil 94 and the consequent reversal of the flow of electric current through said coil causes the control lever 92 to be turned in a clockwise direction, thereby reducing the resistance in the circuit to the magnet coil 51 and consequently increasing the current flow therethrough.

Due to the increasing current flow through the magnet coil 51, the degree of energization of said coil will increase until the downward pull on the movable core member 53 first causes the release valve 59 to be seated. The seating of the valve 59 cuts off the venting of fluid from the triple valve piston chamber 45, and as a result the triple valve piston 47 and graduating slide valve 50 move to the usual lap position, cutting off further supply of fluid under pressure to the relay piston chamber 34, and thereby to the brake cylinder.

The degree of energization of the magnet coil 51, and consequently the downward pull on the movable core member 53, will continue to increase, with the continued movement of the control lever 92 in a clockwise direction, until the supply valve 57 is unseated. The unseating of the supply valve 57 permits fluid under pressure to flow from the supply reservoir 3 to the triple valve piston chamber 45 through pipes 41 and 69, chamber 68 of the self-lapping magnet valve device 6, past the unseated supply valve 57, thence through pipe and passage 64, cavity 114 in the slide valve 78 in the transfer valve device 9, and passage and pipe 46. The consequent increase in the pressure of the fluid in the triple valve piston chamber 45 causes the piston 47 to move to release position, in which the cavity 122 in the main slide valve 49 connects the passage 118 with the atmospheric exhaust passage 123, thereby permitting fluid under pressure to be vented from the relay piston chamber 34 through pipe 35, past the double check valve 119 in the double check valve device 66, chamber 121, the pipe and passage 118, cavity 122 and passage 123. The venting of fluid under pressure from the relay piston chamber 34 effects a reduction in brake cylinder pressure, in the manner hereinbefore described.

The degree of application of the brakes being thus reduced, the weight 98 of the retardation controller device 13 swings toward the right, thereby effecting deenergization of the relay 12 and the consequent movement of the contacts 95, 96 and 97 to the position shown in Fig. 1.

With the contact 97 in open position, as shown in Fig. 1, the circuit to the magnet coil 51 is open and the resulting deenergization of said coil causes the release valve 59 to be unseated, so that fluid under pressure is again vented from the triple valve piston chamber 45. The triple valve device 5 then operates to its service position again and supplies fluid under pressure to the relay piston chamber 34 to effect a reapplication of the brakes.

With the contacts 95 and 96 in the position shown in Fig. 1, as above mentioned, the flow of current through the field coil 94 is reversed and the armature 93, with the contact lever 92, is turned in a counterclockwise direction.

The above mentioned reapplication of the brakes together with the increase in the coefficient of friction between the brake shoes and the wheels causes the rate of retardation of the vehicle to increase, whereupon the retardation controller device again operates to effect energization of the relay 12. The contact 97 is then again operated to the closed position and the contacts 95 and 96 are operated so as to effect a reversal of the current flow through the field coil 94, whereupon the control lever 92 is again turned in a clockwise direction, so that the magnet coil 51 is again energized to a degree increasing with the movement of the control lever. The self-lapping magnet valve device 6 then operates in the manner hereinbefore described to effect operation of the triple valve device 5 first to lap position and then to release position.

As the brake cylinder pressure required to maintain the predetermined rate of retardation decreases with decreased speed, and as brake cylinder pressure decreases with increased energization of the magnet coil 51 when the brake application is being controlled by the tripple valve device, the portion of the variable resistance unit 91 which is connected in the circuit to said magnet coil by operation of the control lever 92 is decreased with each successive movement of said control lever in a clockwise direction, until at the stop all of the variable resistance unit 91 may be cut out of said circuit. In this event, the resistance unit 14 will limit the current supply to the magnet coil 51 and therefore the pressure to which the brake cylinder may be reduced when a pneumatic application is effected in the manner described.

When the vehicle has been brought to a stop, the retardation controller device 13 will assume the normal position shown in Fig. 1, permitting the contact 97 to open the circuit to the magnet coil 51 and the contacts 95 and 96 to effect a reversal of the current flow through the field coil 94 so that the control lever 92 will be turned to the normal position illustrated in Fig. 1. With the magnet coil 51 thus deenergized, fluid under pressure is vented from the triple valve piston chamber 45, whereupon the triple valve device 5 operates to again effect a supply of fluid under pressure to the brake cylinder.

When brake pipe pressure is increased by operation of the brake valve device on the towing vehicle to effect a release of the brakes following an application initiated pneumatically as above described, the pressure in chamber 79 of the transfer valve device 9 is increased thereby and when the pressure therein plus the pressure exerted by the spring 82 on the piston stem 83 becomes a degree greater than the pressure of the fluid in chamber 75, the piston 77 and slide valve 78 will be shifted to their upper positions, as shown in the drawing. With the slide valve 78 in the position shown, the triple valve piston chamber 45 is disconnected from the self-lapping magnet valve device 6 and is again connected to the brake pipe 17 in the manner hereinbefore described. The resulting increase in the fluid pressure in the piston chamber 45 will cause the triple valve device 5 to operate to release position, thereby effecting a release of the brakes and recharge of the control reservoir 7 through the feed groove 117, chamber 48 and the pipe 132.

The increase in brake pipe pressure which effects operation of the transfer valve device 9 to normal position also causes the piston 85 in the transfer valve switch device 10 to return to normal position, as shown in the drawing, thereby opening the circuit from the wires 150 and 151 connecting the source of electric current A to the resistance unit 14 through the contact 90 and operating the contacts 88 and 89 to the positions shown, which it will be understood are the positions permitting the brakes to be controlled electrically by operation of the combined brake switch and brake valve device 1.

If, for any reason, such as failure of the electric control circuit or electric control apparatus, it is desired to effect a service application of the brakes pneumatically, the rotary valve 18 of the combined brake switch and brake valve device 1 is turned to pneumatic service position by operation of the handle 33. In this position, the brake pipe 17 is disconnected from the rotary valve chamber 19, as shown in Fig. 2, thereby cutting off the supply of fluid under pressure from the feed valve device 16 to the brake pipe, and is connected to the atmospheric passage 133 through a restricted cavity 134 in the rotary valve 18. With this connection established, fluid under pressure is vented from the brake pipe at a slow rate.

The reduction in brake pipe pressure thus effected is effective in the triple valve piston chamber 45 and causes the triple valve device 5 to operate to its service position so as to effect a supply of fluid under pressure to the brake cylinder in the manner hereinbefore described. When the desired brake cylinder pressure has been obtained, the combined brake switch and brake valve device is turned to pneumatic lap position, in which the reduction in brake pipe pressure is cut off and the triple valve device 5 thereupon operates to the usual lap position.

When the combined brake switch and brake valve device 1 is turned to release position, brake pipe pressure is restored and the triple valve device 5 operates in the usual manner to release position, thereby effecting a release of the brakes and recharge of the control reservoir 7.

If it is desired to effect an emergency application of the brakes with the combined brake switch and brake valve device 1 for any reason, such as failure of the electric brake control circuits or electric control apparatus, then the handle 33 is turned to emergency position. In this position, the brake pipe 17 is connected to the atmospheric passage 133 by a relatively large cavity 141 in the rotary valve 18, as shown in Fig. 2, thereby permitting a rapid reduction in brake pipe pressure. In response to this rapid reduction in brake pipe pressure, the triple valve device 5 is operated to the usual emergency position, in which communication is established from the valve chamber 48 to the passage 118 past the end of the main slide valve 49, thereby permitting a flow of fluid from the control reservoir 7 to the relay piston chamber 34 at a maximum rate, so as to effect a supply of fluid under pressure from the supply reservoir 3 to the brake cylinder 2 at a fast rate.

The rapid venting of brake pipe pressure is effective in valve chamber 79 of the transfer valve device 9 and will cause said device to operate in the manner hereinbefore described to connect the triple valve piston chamber 45 to the self-lapping magnet valve device 6. The self-lapping magnet valve device 6 being deenergized, the release valve 59 is unseated and the remainder of the fluid in the piston chamber 45 is vented by way of the self-lapping magnet valve device.

It will thus be seen that I have provided an electropneumatic brake equipment for a vehicle operating in high speed service which is flexible in operation, provides fast application and release times, and embodies means for controlling the maximum rate of retardation due to application of the brakes when operating electrically and also when brake pipe pressure is reduced to a predetermined degree in effecting an application of the brakes pneumatically, as by the operation of the brake valve device on a towing vehicle.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake for a vehicle, the combination with a brake pipe, of a valve device operated upon a decrease in pressure for effecting an application of the brakes and operated upon an increase in pressure for effecting a release of the brakes, means operable to effect an increase in pressure in said valve device, means operable upon a predetermined reduction in the pressure of the fluid in said brake pipe to render the first mentioned means effective to increase the pressure in said valve device, and a retardation controller device responsive to the rate of deceleration of the vehicle for controlling the operation of the first mentioned means.

2. In a fluid pressure brake for a vehicle, the combination with a brake pipe, of a valve device operated upon a decrease in pressure for effecting an application of the brakes and operated upon an increase in pressure for effecting a release of the brakes, electroresponsive means operable to effect an increase in pressure in said valve device, means operable upon a predetermined reduction in the pressure of the fluid in said brake pipe to render said electroresponsive means effective to increase the pressure in said valve device, and a retardation controller device responsive to the rate of deceleration of the vehicle for controlling the operation of said electroresponsive means.

3. In a fluid pressure brake for a vehicle, the combination with a brake pipe, of a valve device operated upon a decrease in pressure for effecting an application of the brakes and operated upon an increase in pressure for effecting a release of the brakes, means operable to effect an increase in pressure in said valve device and also operable to effect a decrease in pressure in said valve device, means operable upon a predetermined reduction in the pressure of the fluid in said brake pipe to render the first mentioned means effective to control said valve device, and a retardation controller device responsive to the rate of deceleration of the vehicle for controlling the operation of the first mentioned means.

4. In a fluid pressure brake equipment for a vehicle, the combination with a brake pipe and a brake cylinder, of a triple valve device normally in communication with said brake pipe and operative according to variations in the pressure of the fluid therein to control the supply of fluid under pressure to and release from said brake cylinder and also operative at another time independently of the pressure of the fluid in said brake pipe, and means operative upon a predetermined reduction in the pressure of the fluid in said brake pipe to cut off said communication and to render said triple valve device operative independently of the pressure of the fluid in said brake pipe, and retardation controller means responsive to the deceleration of the vehicle and operable to control the operation of said triple valve device upon operation of said means.

5. In a vehicle brake equipment, the combination with a brake pipe and a brake cylinder, of a triple valve device normally in communication with said brake pipe and operative according to variations in the pressure of the fluid therein to control the supply of fluid under pressure to and release from said brake cylinder, means adapted to control the operation of said triple valve device without varying brake pipe pressure, means operative upon a predetermined reduction in the pressure of the fluid in said brake pipe to cut off said communication and to render the first mentioned means effective to control the operation of said triple valve device, and retardation controlled means responsive to the deceleration of the vehicle for controlling the operation of the first mentioned means whereby the operation of said triple valve device is controlled so as to provide a predetermined rate of retardation of the vehicle.

6. In a vehicle brake equipment, the combination with a brake pipe and a brake cylinder, of a triple valve device operative according to variations in the pressure in said brake pipe to control the supply of fluid under pressure to and release from said brake cylinder, electroresponsive means operative according to variations in the supply of current thereto to control the operation of said triple valve device, said electroresponsive means being operative upon a decrease in the current supply thereto to effect operation of said triple valve device to supply fluid under pressure to said brake cylinder and operative upon an increase in the supply of current thereto to effect operation of said triple valve device to release fluid under pressure from said brake cylinder, means for normally establishing communication from said triple valve device to said brake pipe and for rendering said electroresponsive means ineffective to control the operation of said triple valve device and operative upon a predetermined reduction in brake pipe pressure to close said communication and to render said electroresponsive means effective to control the operation of said triple valve device, and means operative upon a predetermined rate of retardation of the vehicle to vary the supply of current to said electroresponsive means whereby the operation of said triple valve device is controlled so as to substantially maintain said predetermined rate of retardation.

7. In a vehicle brake equipment, the combination with a brake pipe and a brake cylinder, of a triple valve device operative according to variations in the pressure of the fluid in the brake pipe to control the supply of fluid under pressure to and release from said brake cylinder, electroresponsive means operative to at one time control the operation of said triple valve device to supply fluid under pressure to and release from said brake cylinder and at another time to control the supply of fluid under pressure to and release from said brake cylinder independently of said triple valve device, manually operated means for controlling the supply of current to said electroresponsive means to control the supply of fluid under pressure to and release from said brake cylinder independently of said triple valve device, valve means for normally rendering said electroresponsive means effective to control the supply of fluid under pressure to and release from said brake cylinder independently of said triple valve device and for establishing communication from said triple valve device to said brake pipe and operative upon a predetermined reduction in the pressure of the fluid in said brake pipe to render said electroresponsive means ineffective to control the supply of fluid under pressure to and release from said brake cylinder independently of said triple valve device and to close said communication and also to render said electroresponsive means effective to control said triple valve device, and means operative upon a predetermined rate of retardation of the vehicle to control the supply of current to said electroresponsive means so as to substantially maintain said predetermined rate of retardation.

8. In a vehicle brake equipment, the combination with a brake pipe and a brake cylinder, of a triple valve device operative according to variations in the pressure of the fluid in the brake pipe to control the supply of fluid under pressure to and release from said brake cylinder, electroresponsive means operative to at one time control the operation of said triple valve device to supply fluid under pressure to and release from said brake cylinder and at another time to control the supply of fluid under pressure to and release from said brake cylinder independently of said triple valve device, manually operated means for controlling the supply of current to said electroresponsive means to control the supply of fluid under pressure to and release from said brake cylinder independently of said triple valve device, valve means for normally rendering said electroresponsive means effective to control the supply of fluid under pressure to and release from said brake cylinder independently of said triple valve device and for establishing communication from said triple valve device to said brake pipe and operative upon a predetermined reduction in the pressure of the fluid in said brake pipe to render said electroresponsive means ineffective to control the supply of fluid under pressure to and release from said brake cylinder independently of said triple valve device and to close said communication and also to render said electroresponsive means effective to control said triple valve device, switch means normally closing a circuit through which current is adapted to be supplied from said manually operated means to said electroresponsive means and operative substantially concurrently with said valve means to open said circuit and to close another circuit through which current is adapted to be supplied to said electroresponsive means independently of said manually operated means, and means operative upon a predetermined rate of retardation of the vehicle to control the supply of current to said electroresponsive means so as to substantially maintain said predetermined rate of retardation.

9. In a vehicle brake equipment, the combination with a brake pipe and a triple valve device normally in communication with said brake pipe and operative to control the brakes according to variations in the pressure of the fluid in said brake pipe and also operative to control the brakes independently of said pressure, of electroresponsive means adapted to control the operation of said triple valve device without varying the pressure of the fluid in said brake pipe, means operative upon a predetermined reduction in the pressure of the fluid in said brake pipe to cut off the communication between the triple valve device and the brake pipe and to render said electroresponsive means effective to control said triple valve device, and retardation controlled means responsive to the deceleration of the vehicle for controlling the operation of said electroresponsive means whereby the operation of said triple valve device is controlled so as to provide a predetermined rate of retardation of the vehicle.

10. In a vehicle brake equipment, the combination with an electroresponsive device operative according to the degree of energization thereof to control the degree of application of the brakes, an electric motor driven variable resistance device comprising a variable resistance unit in the circuit to said electroresponsive device, a movable member operative to control the resistance of said variable resistance unit in said circuit, an electric motor for controlling said movable member, said motor being operable upon flow of current in one direction through the field coil thereof to effect movement of said movable member to increase the resistance of said resistance unit in said circuit and thereby decrease the degree of energization of said electroresponsive means and being operable upon flow of current in the opposite direction through said field coil to effect movement of said movable member to decrease the resistance of said resistance unit in said circuit and thereby increase the degree of energization of said electroresponsive means, and retardation controlled means responsive to the deceleration of the vehicle and operative to control the direction of current flow through said field coil.

11. In a fluid pressure brake equipment, the combination with a brake pipe, of an electro responsive valve device operative to control the application of the brakes, a circuit for energizing said valve device, normally closed contacts in said circuit, a resistance device, means operative upon a predetermined reduction in brake pipe pressure to open said contacts and for connecting said resistance device in circuit with said valve device, a relay operable to interrupt or to complete said last circuit, and a retardation controller device for controlling said relay.

12. In a fluid pressure brake equipment, a brake cylinder, means responsive to the pressure of the fluid supplied thereto for controlling the supply of fluid to and the release of fluid from the brake cylinder, an electroresponsive valve device operative according to variations in the supply of current thereto to control the supply of fluid to and the release of fluid from said means, a resistance adapted to be connected in series with the electroresponsive valve device, a member movable between spaced points to vary the amount of said resistance in series with the electroresponsive valve device, circuit means for connecting the resistance in series with the electroresponsive valve device whereby movement of the movable member from one of said spaced points toward the other of said spaced points effects an increase in the amount of resistance in series with said electroresponsive valve device, and other circuit means for connecting the resistance in series with the electroresponsive valve device whereby movement of the movable member from said one of said spaced points toward the other of said spaced points effects a decrease in the amount of resistance in series with said electroresponsive valve device.

13. In a vehicle braking equipment, a brake cylinder, means responsive to variations in the pressure of fluid supplied thereto for controlling the supply of fluid to and the release of fluid from the brake cylinder, an electroresponsive valve device operative according to the variations in the supply of current thereto to control the supply of fluid to and the release of fluid from said means, means including a member movable responsive to the rate of retardation of the vehicle for controlling the supply of current to the electroresponsive valve device, and means to condition said last named means to operate at one time in response to a predetermined increase in the rate of retardation of the vehicle to effect a decrease in the supply of current to the electroresponsive valve device, and at another time to operate in response to a similar increase in the rate of retardation of the vehicle to effect an increase in the supply of current to the electroresponsive valve device.

14. In a vehicle braking equipment, a brake cylinder, a brake pipe, means responsive to variations in the pressure of fluid supplied thereto for controlling the supply of fluid to and the release of fluid from the brake cylinder, an electroresponsive valve device operative according to variations in the supply of current thereto to control the supply of fluid to and the release of fluid from said means, means including a member movable responsive to the rate of retardation of the vehicle for controlling the supply of current to the electroresponsive valve device, and means to condition the last named means to operate at one time in response to a predetermined increase in the rate of retardation of the vehicle to effect a decrease in the supply of current to the electroresponsive valve device, and operative upon a predetermined reduction in the pressure of the fluid in the brake pipe to operate in response to a similar increase in the rate of retardation of the vehicle to effect an increase in the supply of current to the electroresponsive valve device.

15. In a fluid pressure brake equipment, in combination, a brake pipe, a brake cylinder, a relay valve device operative on an increase in the pressure of the fluid supplied thereto to supply fluid under pressure to the brake cylinder, valve means subject to and operated on a reduction in the pressure of the fluid supplied thereto to supply fluid under pressure to a passage through which fluid under pressure may be supplied to the relay valve device, electroresponsive means adapted to control the pressure of the fluid in a chamber, and valve mechanism subject to and operated on a predetermined increase in the pressure of the fluid in the brake pipe to establish communication between said chamber and the relay valve device, and operative on a predetermined reduction in the pressure of the fluid in the brake pipe to establish communication between said chamber and said valve means.

16. In a fluid pressure brake equipment, in combination, a brake pipe, a brake cylinder, a relay valve device operative on an increase in the pressure of the fluid supplied thereto to supply fluid under pressure to the brake cylinder, valve means subject to and operated on a reduction in the pressure of the fluid supplied thereto to supply fluid under pressure to a passage through which fluid under pressure may be supplied to the relay valve device, electroresponsive means adapted to control the pressure of the fluid in a chamber, valve mechanism subject to and operated on a predetermined increase in the pressure of the fluid in the brake pipe to establish communication between said chamber and the relay valve device, and operative on a predetermined reduction in the pressure of the fluid in the brake pipe to establish communication between said chamber and said valve means, and means responsive to the rate of retardation of the vehicle for controlling operation of the electroresponsive means.

GEORGE W. BAUGHMAN.